(12) United States Patent
Faworski

(10) Patent No.: US 6,172,806 B1
(45) Date of Patent: Jan. 9, 2001

(54) CONCENTRIC TELESCOPE SYSTEM

(75) Inventor: Sheldon Faworski, Union, IL (US)

(73) Assignee: Lomo America, Inc., Prospect Heights, IL (US)

( * ) Notice: Under 35 U.S.C. 154(b), the term of this patent shall be extended for 0 days.

(21) Appl. No.: 09/488,167

(22) Filed: Jan. 20, 2000

(51) Int. Cl.[7] .............................. G02B 23/00; G02B 5/08
(52) U.S. Cl. ............................................. 359/420; 359/857
(58) Field of Search ..................................... 359/399, 419, 359/420, 421, 431, 850, 857, 858, 862, 872

(56) References Cited

U.S. PATENT DOCUMENTS

| | | | |
|---|---|---|---|
| 3,645,602 | * | 2/1972 | Clave et al. ........................ 359/421 |
| 6,061,175 | * | 5/2000 | Watters ................................ 359/399 |

FOREIGN PATENT DOCUMENTS

| | | | |
|---|---|---|---|
| 8089 | * | 6/1911 | (GB) ................................ 359/421 |
| 15123 | * | of 1912 | (GB) ................................ 359/420 |

* cited by examiner

Primary Examiner—Cassandra Spyrou
Assistant Examiner—Jared Treas
(74) Attorney, Agent, or Firm—Boris Parad; Parad Law Offices, P.C.

(57) ABSTRACT

A universal dual power telescope comprises two concentrically mounted telescopes combining functions of a tube-mounted finder and a regular telescope. The finder rotating inside the telescope includes a truncated prism for switching the telescope modes of operation. The dual function prism reflects images into the eyepiece either through the finder or telescope, while deflecting light rays and blocking formation of images through the other non-selected optical assembly. Both telescopes share the same eyepiece and focusing system. A low magnification finder or a high magnification telescope can be selectively engaged by changing an angular position of the prism's silvered plane.

8 Claims, 1 Drawing Sheet

CONCENTRIC TELESCOPE SYSTEM

BACKGROUND OF THE INVENTION

1. Field of the Invention

This invention relates to a prismatic telescope optical system employing two concentrically mounted telescopes with different magnifications and sharing the same eyepiece and focusing device for a telescope and a viewfinder rotatable inside the telescope.

2. Description of the Prior Art

The prior art is replete with prismatic telescope optical assemblies. For example, U.S. Pat. No. 5,598,296 issued to Imizumi in 1997 disclosed a prismatic telescope optical system including a series of telescopes having different magnification but equal in overall length. The prism optical system of one telescope has a hollow mirror prism and that of another telescope has a glass prism having a proper refractive index.

U.S. Pat. No. 5,548,442 issued to Devenyi et al. in 1996 disclosed an optical sight assembly including a plurality of optical elements moveable into an optical path and a permanent magnet indicating the position of the first or the second set of said optical elements.

U.S. Pat. No. 4,749,271 issued to Nagler in 1998 disclosed a finder scope for use with and spaced apart from the attendant astronomical telescopes.

U.S. Pat. No. 3,572,886 issued to Curtiss et al. in 1971 disclosed a dual power telescope with two portions of a field of view being simultaneously observed and the magnification of each portion differing from that of the other portion.

U.S. Pat. No. 1,530,081 issued to Humbrecht in 1925 disclosed a periscope with entrance and deflection prism with moveable lenses.

U.S. Pat. No. 1,294,365 issued to Bedell in 1919 disclosed a bi-focal periscope with shiftable elements and optical elements operated by power from the compressed air line of the submarine.

U.S. Pat. No. 1,187,818 issued to Cooke in 1916 disclosed a telescope with two powers of magnification and two or more eyepieces or equal length brought to the prism.

U.S. Pat. No. 4,669,883 issued to Mise in 1987 disclosed a spotting scope with a viewer mounted on the telescope.

U.S. Pat. No. 2,619,874 issued to Lane in 1952 disclosed a telescope a viewfinder with prismatic system including four reflecting surfaces and two prisms.

U.S. Pat. No. 841,262 issued to Martin disclosed a binocular prism-telescope with a toothed wheel and a knurled wheel for operating the toothed rims and the tubes.

However, none of the known prior art patents revealed a unique prismatic telescope incorporating a rotating finder scope in its structure as shown in the attached drawings and described herein.

SUMMARY OF THE INVENTION

The present invention is a telescope with a coaxially mounted and rotatable finder assembly. That assembly includes a glass prism having one side silvered for reflecting light arrays into the eyepiece either through the finder or telescope optical elements. The dual function telescope uses the same focuser and eyepiece, reduces weight and cost of the telescope, and eliminates parallax and balancing problems associated with the finder's separate mounting.

DETAILED DESCRIPTION OF THE INVENTION

Figure 1:
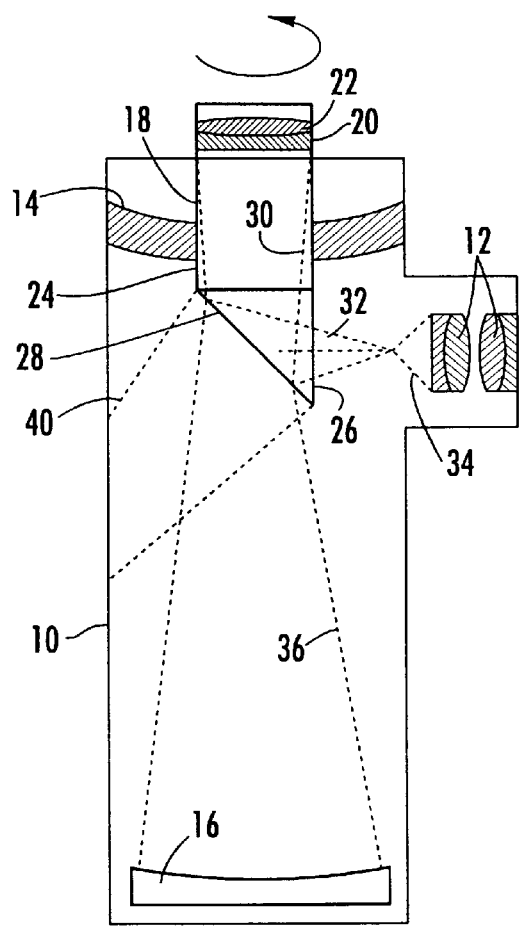
FIG. 1 is a schematic representation of the present invention in a finder mode.
Figure 2:
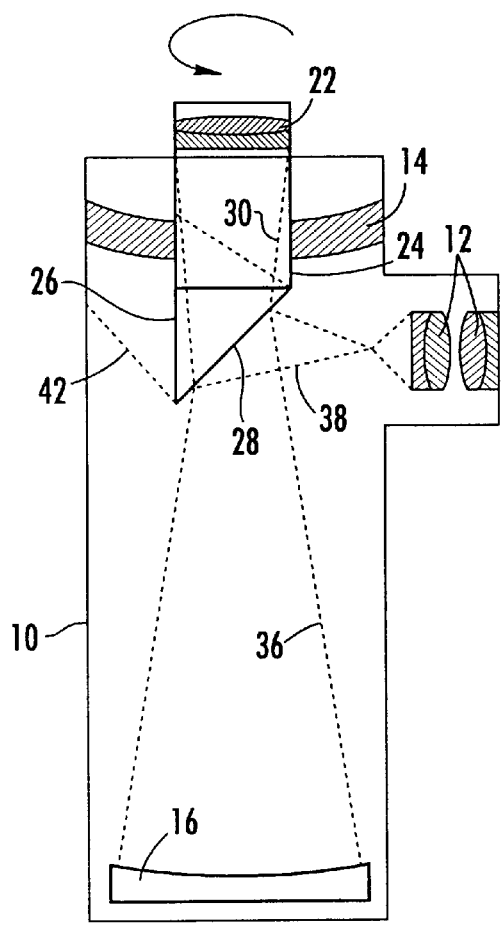
FIG. 2 is a schematic showing the present invention in a telescope mode.

Referring to FIG. 1 and FIG. 2, a novel telescope 10 comprises an eyepiece focusing system 12 mounted on the telescope's tube side. Light rays enter the telescope through a meniscus corrector 14 and bounced off the primary mirror 16. A rotating finder assembly 18 is a cylinder coaxially mounted with and within the telescope tube. A front section 20 of that cylinder protrudes from the telescope tube. That section is used as a knob for grasping and rotating the finder.

The finder or finder scope 18 includes an achromat or finder objective lens 22. The back section 24 of the finder cylinder projects through the meniscus corrector 14 into the telescope tube. A cylinder glass prism 26 is attached to the tip of that finder section 24. The prism cylinder 26 is truncated with a silvered or aluminized plane 28. The inclined plane 28 is used for reflecting the light beams at a selected angle. The reflector plane 28 is facing the high power telescope mirror 16.

Light rays enter the telescope through the finder objective 22 and meniscus corrector 14. By rotating the finder knob 20, the optical system can be set in either a finder scope or telescope mode. The finder scope mode of operation is shown in FIG. 1. The light rays entering through the objective 22 form a cone 30. The silvered plane 28 reflects the finder light entrance cone 30 into a ray reflector cone 32. The cone 32 beams images entered through the finder into the eyepiece light cone 34.

In the finder mode of operation, the viewer looking into the eyepiece sees images constructed by the finder optical system, while excluding formation of images through the telescope. The mirror 16 reflects the light beamed into the telescope tube through the meniscus corrector 14. The mirror reflected light cone 36 reaches the prism reflector plane 28. The inclined plane 28 deflects this light cone 36 into the deflector cone 40 aimed to the interior of the telescope tube. Therefore, the telescope-generated light beams dissipated in the telescope tube cannot erect an image viewable through the eyepiece 12.

When the knob 20 turns the finder into a telescope mode of operation shown in FIG. 2, the prism plane 28 is angled in such a way so to reflect the mirror reflected cone 36 into the prism reflected cone 38. The cone 38 then beams images into the eyepiece cone 34 and the viewer can observe telescope magnified images in the eyepiece. In the telescope mode of operation shown in FIG. 2, the inclined silvered plane 28 functions as a deflector of the finder light cone 30 into a deflector cone 42 for dissipating the light rays into the telescope tube. Thus, the finder-generated images cannot be formed and seen in the eyepiece 12 in the telescope mode of use.

A telescope has a very small field of view, such as a 0.5 degree or one degree field. This makes it difficult and time consuming for a viewer to find an object in space through the telescope. A finder scope is a low power or low magnification telescope having a significantly larger field of view. This permits an observer to scan the sky or vast areas relatively quickly in order to locate an object. Traditionally, a finder is rigidly affixed to a telescope, which allows an observer to zero in on the object found with the help of the finder scope. A telescope is larger is size than a finder scope because its optical system requires a longer focal length for high magnification.

The subject telescope permits a monocular or binocular viewing of the target through the eyepiece, while switching from a finder to a telescope mode of operation and vice versa. A knob rotation changing a ray path enables a viewer to observe targets with two different powers of magnification using a single focusing system. The concentrical positioning of a finder and a telescope eliminates parallax, two-tube weight balance, and constant finder-telescope axis re-aligning problems arising from conventional mounting of the finder outside the telescope's tube.

The present invention reduces the weight of a telescope and allows a single hand manipulation of one knob. The rotating finder structure facilitates continuous precise alignment between a telescope and a finder. The improved telescope is more compact and lighter than a conventional telescope, since no structure is affixed to the telescope'ss outer surface. The two-in-one telescope configuration does away with the need to refocus the finder and telescope because they are parfocaled.

One of unique features of the present invention is a prism reflector plane 28, which changes a ray path and telescope's magnification power without any electronic circuitry or magnetic gadgetry. The dual function reflector plane 28 reflects images into the eyepiece in the selected mode of use or optical assembly, while deflecting the light rays and blocking formation of images through another optical assembly. Simple and quick engagement of two telescopes for high or low magnification is accomplished by the angular position of the rotating reflector plane 28 of the finder-mounted glass prism.

Besides its astronomical viewing application, this dual power telescope can be used in tanks, armored vehicles and other weapon carriers where time and precision are of great importance. The present invention's advantage rests with the avoidance of reorientation in shifting magnifications. A target found through a finder scope can be observed through the telescope in greater detail without switching an eyepiece or looking at another portion of the field of view. Due to its simplicity, the improved telescope is impervious to radio frequency energy interference or electromagnetic energy interference damaging or causing error in optical assembly electronic circuitry in weapon carriers.

Although the present invention has been described with reference to a preferred embodiment, it will be understood by those skilled in the art that numerous changes, omissions and additions may be made without departing from the spirit and scope of the subject invention.

What is claimed is:

1. A dual-mode magnifying system comprising:
a high magnification optical assembly;
a low magnification optical assembly;
said assemblies mounted inside a tube;
a cylinder prism truncated with a reflector plane at one end; and
said cylinder prism selectively engaging said optical assemblies for image erection via rotation of said reflector plane and wherein said optical assemblies and said cylinder prism are concentrically mounted in the tube.

2. A system as claimed in claim 1, and said cylinder prism being affixed to the low magnification optical assembly.

3. A dual power telescope comprising:
a low power finder scope coaxially and rotatably mounted inside a high power telescope;
a prism selectively engaging said finder scope and telescope;
said prism having an inclined plane for reflecting light rays into an eyepiece common to said finder scope and telescope;
said prism having a rotating means for changing an angular position of said inclined plane.

4. A dual power telescope as claimed in claim 3, and
said rotating means including a cylinder protruding from said telescope at one end; and
Said cylinder holding said prism inside the telescope.

5. A dual power telescope as claimed in claim 3, and
said finder scope rigidly secured to and rotated with said prism;
said inclined plane blocking image formation through a telescope in a finder scope mode of operation.

6. A concentric telescope system comprising:
a low power telescope rotatably mounted inside a high power telescope;
said lower power telescope mounted at the light-entering end of said high power telescope;
said lower power telescope connected to a prism selectively reflecting images through said telescopes;
said telescopes having a common eyepiece;
said prism having a reflector plane for guiding light rays at a selected angle;
said prism being rotated for selecting the telescopes for image formation in said eyepiece.

7. A concentric telescope system as claimed in claim 6, and
said high power telescope having a mirror mounted in opposition to its light entering end;
said lower power telescope having its light-entering end protruding from said high power telescope;
said prism being transparent except said reflector plane truncating said prism.

8. A concentric telescope system as claimed in claim 6, and
said prism being mounted at the end of said low power telescope;
said high power telescope having a mirror reflecting light rays;
said reflector plane facing said mirror at selected angles for reflecting and deflecting light rays beamed from said mirror.

* * * * *